(12) United States Patent
Larry et al.

(10) Patent No.: US 11,524,580 B2
(45) Date of Patent: Dec. 13, 2022

(54) VIDEO DISPLAY RETRACTABLE TO VEHICLE HEADLINER WITH DUAL DEPLOYMENT LOCATIONS

(71) Applicant: FORD GLOBAL TECHNOLOGIES, LLC, Dearborn, MI (US)

(72) Inventors: Mark W. Larry, Macomb, MI (US); Biaohe Guo, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 243 days.

(21) Appl. No.: 17/098,814

(22) Filed: Nov. 16, 2020

(65) Prior Publication Data

US 2022/0153134 A1  May 19, 2022

(51) Int. Cl.
| | | |
|---|---|---|
| *B60K 35/00* | (2006.01) | |
| *G06F 1/16* | (2006.01) | |
| *G02F 1/1333* | (2006.01) | |
| *G09F 9/30* | (2006.01) | |

(Continued)

(52) U.S. Cl.
CPC ...... *B60K 35/00* (2013.01); *B60K 2370/1523* (2019.05); *B60K 2370/1533* (2019.05); *B60K 2370/28* (2019.05); *B60K 2370/52* (2019.05); *B60K 2370/67* (2019.05); *B60K 2370/692* (2019.05); *B60K 2370/77* (2019.05); *B60K 2370/771* (2019.05); *B60R 11/0229* (2013.01); *B60R 2011/0092* (2013.01); *G02F 1/133342* (2021.01); *G06F 1/1652* (2013.01);

(Continued)

(58) Field of Classification Search
CPC ............ B60K 35/00; B60K 2370/1533; B60K 2370/28; B60K 2370/52; B60K 2370/67; B60K 2370/692; B60K 2370/77; B60K 2370/1523; B60K 2370/771; B60K 2370/797; B60K 2700/00; B60R 11/0229; B60R 2011/0092; B60R 2011/0084; B60R 13/0212; G02F 1/133342; G06F 1/1652; G09F 9/301; G09F 21/04; G09F 21/049; G09G 2300/023; G09G 2340/14; G09G 2380/10; G09G 2380/02; E06B 2009/2464

See application file for complete search history.

(56) References Cited

U.S. PATENT DOCUMENTS

| | | |
|---|---|---|
| 8,361,851 B2 | 1/2013 | Zhu et al. |
| 8,362,992 B2 | 1/2013 | Kuhlman et al. |
| 10,249,247 B2 | 4/2019 | Wang et al. |

(Continued)

*Primary Examiner* — Douglas M Wilson
(74) *Attorney, Agent, or Firm* — Frank L. Lollo; MacMillan, Sobanski & Todd, LLC

(57) ABSTRACT

A retractable video screen has switchable opaque films laminated onto a transparent display panel. A transport unit at a headliner of a passenger cabin includes a motorized carrier configured to move the video screen to 1) a stowed position in which the video screen is retained horizontally in the transport unit, 2) a forward position where the video screen hangs vertically from a forward end of the transport unit, and 3) a rearward position where video screen hangs vertically from a rearward end of the transport unit. A first opaque film is opaque and a second opaque film is clear when the carrier is forward, so that the display panel is viewable from the seating area. The second opaque film is opaque and the first opaque film is clear when the carrier is rearward, so that the display panel is viewable from outside the vehicle through the liftgate opening.

16 Claims, 5 Drawing Sheets

(51) Int. Cl.
    *B60R 11/02*     (2006.01)
    *B60R 11/00*     (2006.01)
(52) U.S. Cl.
    CPC ....... *G09F 9/301* (2013.01); *G09G 2300/023* (2013.01); *G09G 2340/14* (2013.01); *G09G 2380/10* (2013.01)

(56) References Cited

U.S. PATENT DOCUMENTS

| | | |
|---|---|---|
| 10,520,782 B2 | 12/2019 | Busch |
| 10,545,336 B2 | 1/2020 | Dubey et al. |
| 2006/0191180 A1 | 8/2006 | Williams et al. |
| 2009/0231662 A1 | 9/2009 | Sorensson et al. |
| 2013/0113682 A1* | 5/2013 | Heizer ................. G06F 3/1423 345/1.1 |
| 2018/0217429 A1* | 8/2018 | Busch .................. G02B 27/017 |
| 2018/0350280 A1 | 12/2018 | Poole |
| 2019/0092170 A1* | 3/2019 | Gassman ............... B60J 3/0204 |
| 2021/0162931 A1* | 6/2021 | Bruegl ................ B60R 11/0235 |

* cited by examiner

VIDEO DISPLAY RETRACTABLE TO VEHICLE HEADLINER WITH DUAL DEPLOYMENT LOCATIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to video displays in the passenger cabin of a motor vehicle, and, more specifically, to flexible displays deployable from a stowed position in a headliner of a passenger cabin.

In some passenger vehicles (such as business vehicles, limousines, large vans, and busses) where a driver's line-of-sight toward the rear of the vehicle would not be blocked, it may be desirable to provide a large video display for business purposes (e.g., video conferences, presentations, or sharing documents) or for entertainment purposes. Since fixed large displays would take too much space in a vehicle cabin and would not be needed all the time, a stowable display can be built into a ceiling or wall of the cabin. Even in personal or family vehicles, it is known to use a hinge-mounted display in a vehicle headliner that pivots down to provide video entertainment to rear seat passengers using a rigid video screen. With the introduction of display technologies having flexible screens, it has also become possible to deploy the display from a rolled-up position, similar to a window shade.

Another potential vehicular use of large video display is as a tailgate display. The tailgate display could be viewed from outside the vehicle when it is stationary and the rear (i.e., liftgate) door is open, e.g., to watch entertainment content when camping or picnicking. Since there would be very little available space in the trunk/cargo area of a vehicle cabin for a large display, a rollable video screen would most likely have to be used. However, known deployments of rollable/foldable displays provide viewing from only one direction (i.e., when configured to unroll in a manner that provides a display visible from outside the vehicle it would not be possible to project the video to viewers inside the passenger cabin). Thus, in order to provide viewing options for both interior passengers and people outside the vehicle, multiple large displays would have to be installed on a vehicle.

SUMMARY OF THE INVENTION

The invention provides a video display system in which one flexible screen can be deployed from a single stowed location into multiple extended locations (e.g., in front of the rear seats or at the tailgate opening) and can be configured for viewing from either side of the screen. Instead of rolling up a flexible display screen, the invention stows the display screen substantially flat at or in the headliner of the passenger cabin and transports the screen forward or rearward so that the opposite ends of the display screen can drop downward at either a forward or a rearward end. In order to selectably project an image from one side or the other of the video screen, the main flexible display screen is made transparent and each side is laminated by a film that can be switched between a clear state or an opaque state.

In one aspect of the invention, a display apparatus is provided for a passenger cabin of a vehicle having a seating area and a liftgate opening. A flexible video screen has first and second switchable opaque films and a transparent, light-emitting display panel. The first and second switchable opaque films are laminated to opposing surfaces of the display panel. A transport unit is mounted at a headliner of the cabin over the seating area. The transport unit includes a motorized carrier which is coupled to the video screen. The motorized carrier is configured to move the video screen to 1) a stowed position in which the video screen is retained horizontally in the transport unit, 2) a forward position in which the video screen hangs vertically from a forward end of the transport unit, and 3) a rearward position in which the video screen hangs vertically from a rearward end of the transport unit. The first opaque film is switched to an opaque state and the second opaque film is switched to a clear state when the motorized carrier is in the forward position so that light generated by the display panel is viewable from the seating area. Conversely, the second opaque film can be switched to an opaque state and the first opaque film can be switched to a clear state when the motorized carrier is in the rearward position so that light generated by the display panel is viewable from outside the vehicle through the liftgate opening.

DETAILED DESCRIPTION OF PREFERRED EMBODIMENTS

The invention employs flexible transparent display constructions together with switchable opaque film technologies to develop a storable rear seat and tailgate display system. In particular, a bi-directional display apparatus is configured to be stowed in a vehicle in a way that allows it to be extended at the positions of either a rear seat display or a tailgate display.

The flexible transparent display can be comprised of an Organic Light Emitting Diode (OLED) display technology, a Micro-LED display, or a Quantum Dot LED Display, for example. The switchable opaque film is preferably electrically controlled to switch between an opaque state and a transparent state. The switchable opaque film can be comprised of a Polymer-dispersed Liquid Crystal (PDLC) panel, or a Suspended Particle Devices (SPD) panel. These switchable panels can likewise be made using flexible substrates. Other flexible transparent display technologies and switchable films may be developed in the future that also could be laminated and deployed as described herein.

Figure 1:
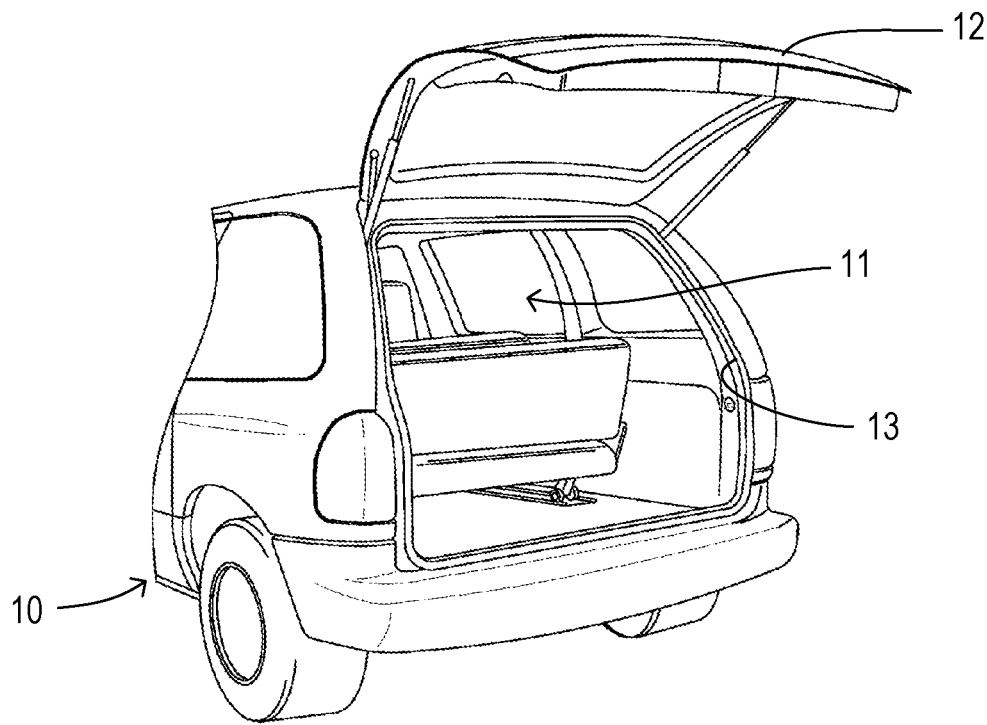
FIGS. 1 and 2 are perspective views of a vehicle with an opened liftgate and with a deployable video screen being retracted and extended, respectively.
Figure 2:
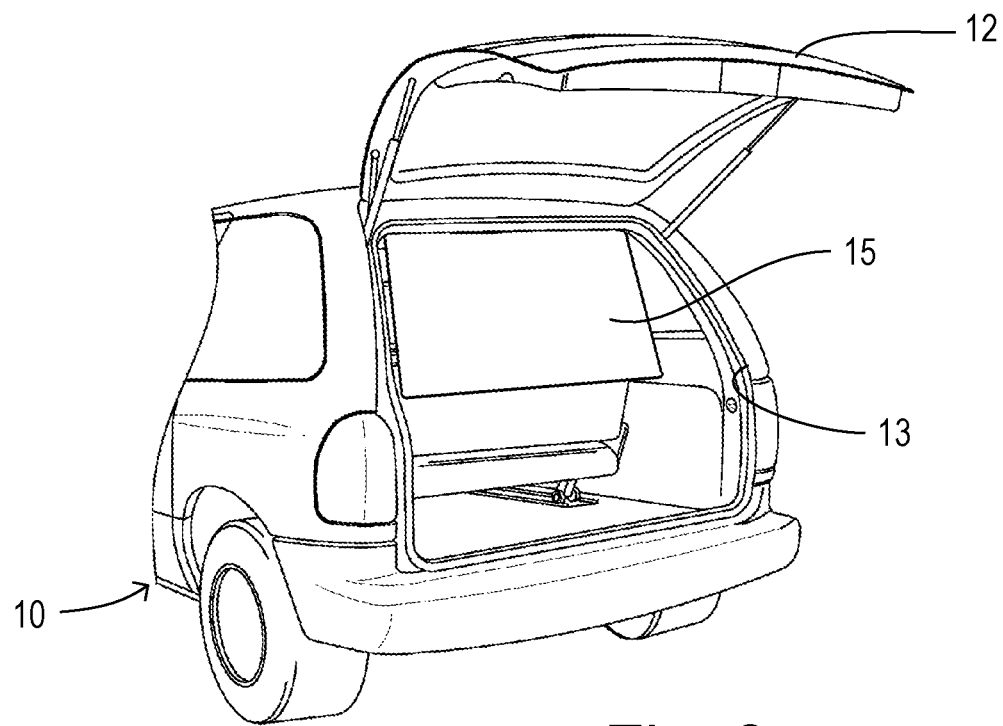

FIGS. 1 and 2 show a vehicle 10 having a passenger cabin 11. A liftgate door 12 is installed at a tailgate opening 13. With liftgate 12 in an opened position as shown, a tailgate video display 15 can be lowered from a ceiling headliner in cabin 11 to a deployed configuration so that video images can be viewed from outside vehicle 10. The types of video displays that have previously been used or suggested for vehicle installation have been unidirectional (i.e., viewable from one side). In the case of a tailgate display screen, the unidirectional nature of the display is not a concern since few vehicles have rear-facing seats. In order to provide viewing for passengers in seating rows behind the driver's seat with a large display screen, however, a separate display unit would be provided as shown in FIG. 3.

Figure 3:
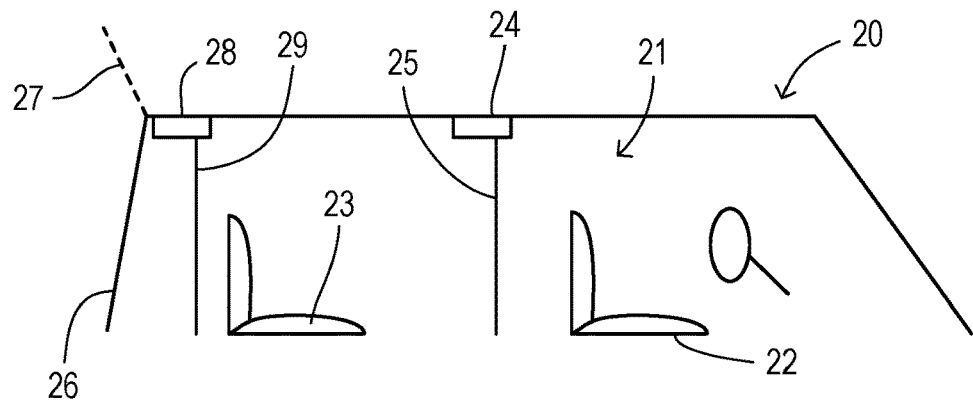
FIG. 3 is a diagram showing a vehicle passenger cabin with a prior art video screen that deploys in front of a rear seating area.

In FIG. 3, a vehicle 20 has a passenger cabin 21 with a front seating row 22 and a rear seating row 23. For passengers in row 23, a video display screen 25 deploys from a headliner housing 24. Display screen 25 may be rollable and could deploy by unrolling when vehicle 20 is stopped, for example. Vehicle 20 has a liftgate door 26 which pivots to an open position 27. Another headliner housing 28 is located close to door 26 so that a flexible video display screen 29 can be unrolled as a tailgate display for viewers outside vehicle 20. Thus, in order to provide video images according to both modes of use, the costs of components (e.g., video screen, video controller, housing, wiring, user interface) and the need for packaging space are all duplicated.

Figure 4:
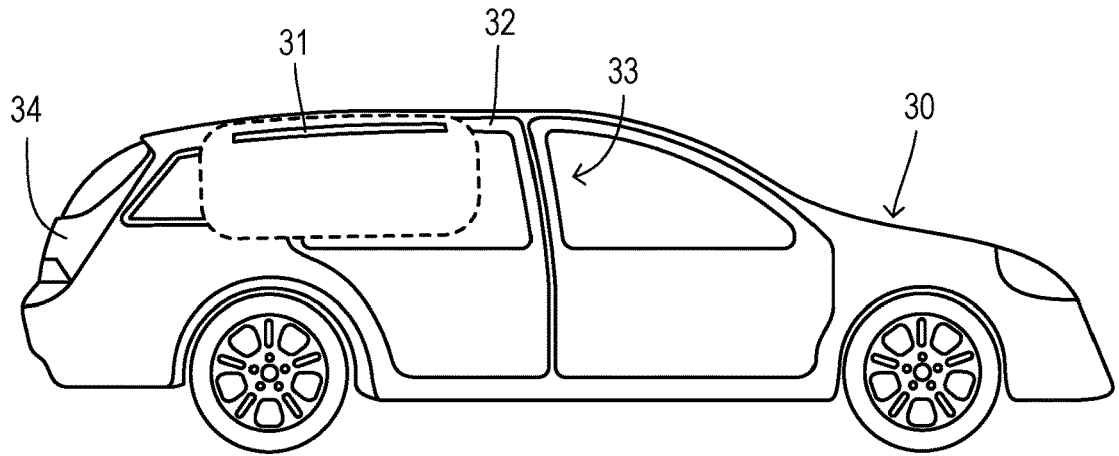
FIG. 4 is a side view of a vehicle of the invention with a flexible video screen in a stowed position.
Figure 5:
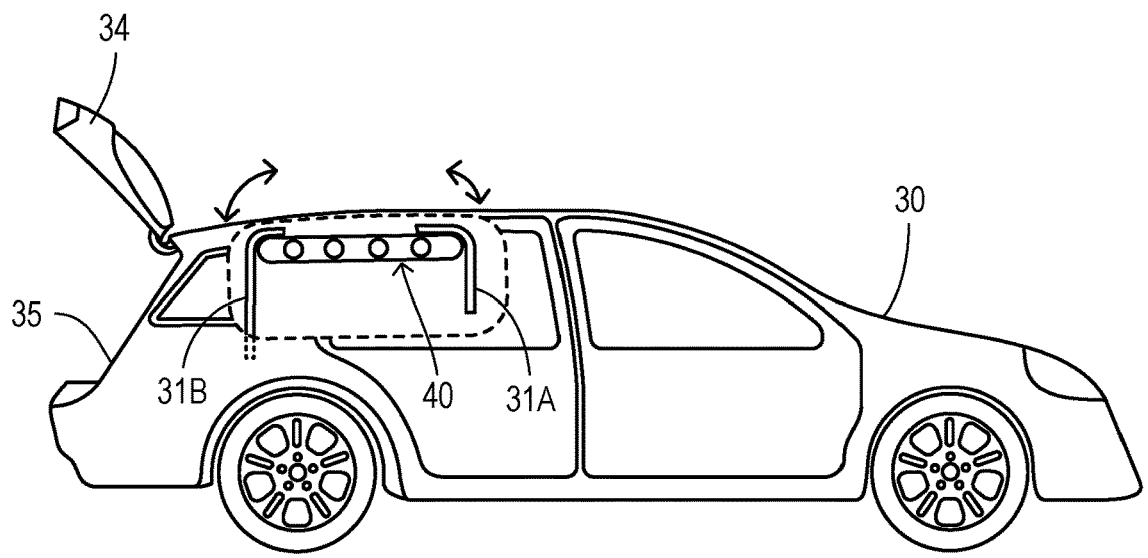
FIG. 5 is a side view of the vehicle of FIG. 4 depicting forward and rearward positions of the flexible video screen.

FIGS. 4 and 5 show a vehicle 30 having a deployable bidirectional video screen 31 according to one embodiment of the present invention. Vehicle 30 has a roof headliner 32 at the top of a passenger cabin 33. As described in more detail below, flexible video screen 31 comprises first and second switchable opaque films laminated to opposing surfaces of a transparent, light-emitting display panel. FIG. 4 shows a stowed position of screen 31 at or in headliner 32 such that screen 31 lies generally in a flat, horizontal plane. Screen 31 may be concealed behind headliner 32 or within a separate housing mounted to headliner 32, for example. The separate housing or headliner 32 may have slotted openings at a forward edge and a rearward edge through which screen 31 can be deployed. As shown in FIG. 5, a transport unit 40 is mounted at headliner 32 over the seating area (either behind headliner 32 or within a separate housing) which engages screen 31 to slide forward or rearward between at least three positions. The positions include the stowed position of FIG. 4, a forward position at 31A in FIG. 5 for viewing by rear seat passengers, and a rearward position at 31B in FIG. 5 for viewing by tailgaters outside vehicle 30 through door opening 35. In forward position 31A, one end of screen 31 hangs vertically from a forward end of the transport unit. In rearward position 31B, the other end screen 31 hangs vertically from a rearward end of the transport unit. Thus, in position 31A one side of screen 31 is arranged toward the passengers, and in position 31B an opposite side of screen 31 is arranged toward the viewers outside the vehicle. By utilizing a bidirectional display as described in greater detail below, the invention can selectably provide either viewing arrangement with a single video screen.

Figure 6:
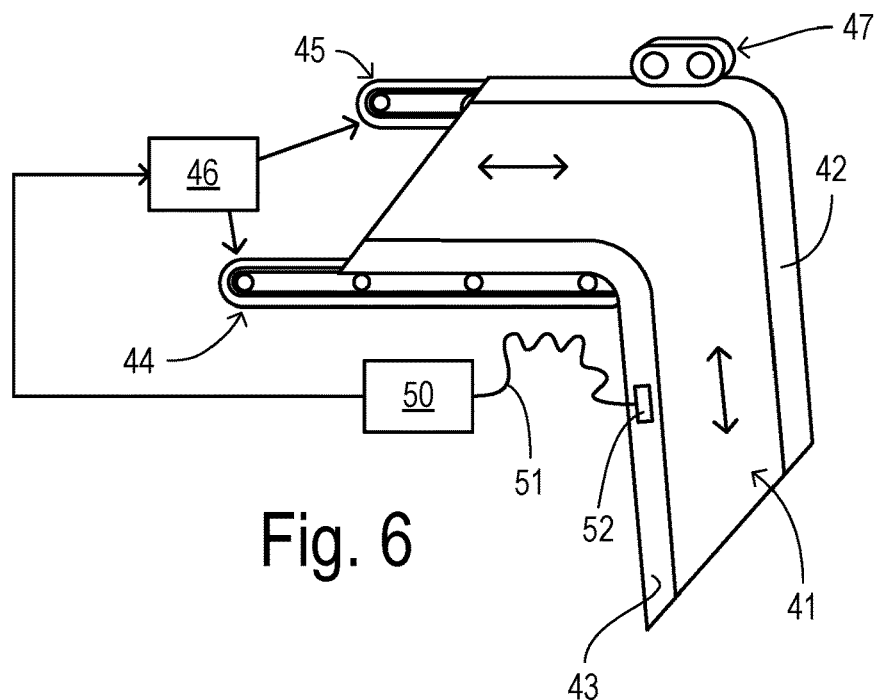
FIG. 6 is a perspective view of a transport unit, flexible video screen, and a display controller.

As shown in FIG. 6, transport unit 40 may include a motorized carrier comprised of moving tracks (e.g., belts) 44 and 45 with one or more driving motors 46. For example, tracks 44 and 45 may be continuous loops and are configured to engage opposite lateral sides of video screen 41. In addition, one or more idlers 47 or other retaining features may be utilized for retention and alignment of a video screen 41. Screen 41 has fringe strips 42 and 43 along its lateral sides (i.e., bordering a central light-emitting display portion). Fringe strips 42 and 43 directly engage the carrier tracks, and they provide a substrate for electrical conductors and connectors to convey power and data signals (e.g., video frame signals and opaque film control signals) to the display panel and switchable opaque films, respectively. A system controller 50 is coupled to a display connector 52 on fringe strip 43 via a flexible cable 51. Controller 50 is further connected to driving motor(s) 46 to activate them when moving display screen 41 between positions.

Figure 7:
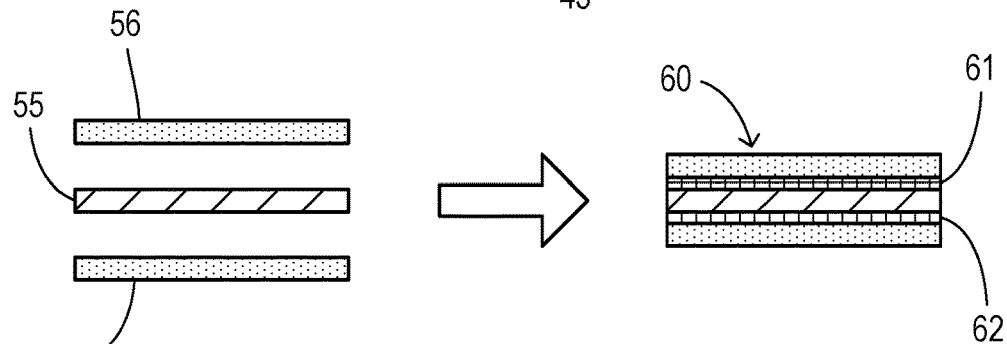
FIG. 7 is a diagram showing a lamination process for manufacturing a video screen having a light-emitted display panel and switchable opaque films.

One preferred embodiment of a laminated video screen is shown in FIG. 7. A transparent light-emitting display panel (e.g., an OLED display unit, micro-LED display unit, or quantum dot LED display unit) 55 uses all transparent components so that light generated at each pixel can be emitted in both directions. For effective viewing, an opaque background is needed behind display panel 55. This is provided by switchable opaque films 56 and 57. Each opaque film 56 and 57 includes a respective transparent substrate carrying crystal and/or suspended particle structures. Films 56 and 57 are laminated onto panel 55 using layers 61 and 62 of an optical bonding material such as optically clear adhesive (OCA, which is a film based adhesive) or optically clear resin (OCR, which is a liquid adhesive) to form a flexible video screen 60. In addition, one or more layers of flexible transparent protective materials may be applied over the outer surfaces of switchable opaque film 56 and 57 to protect display screen 60.

Figure 8:
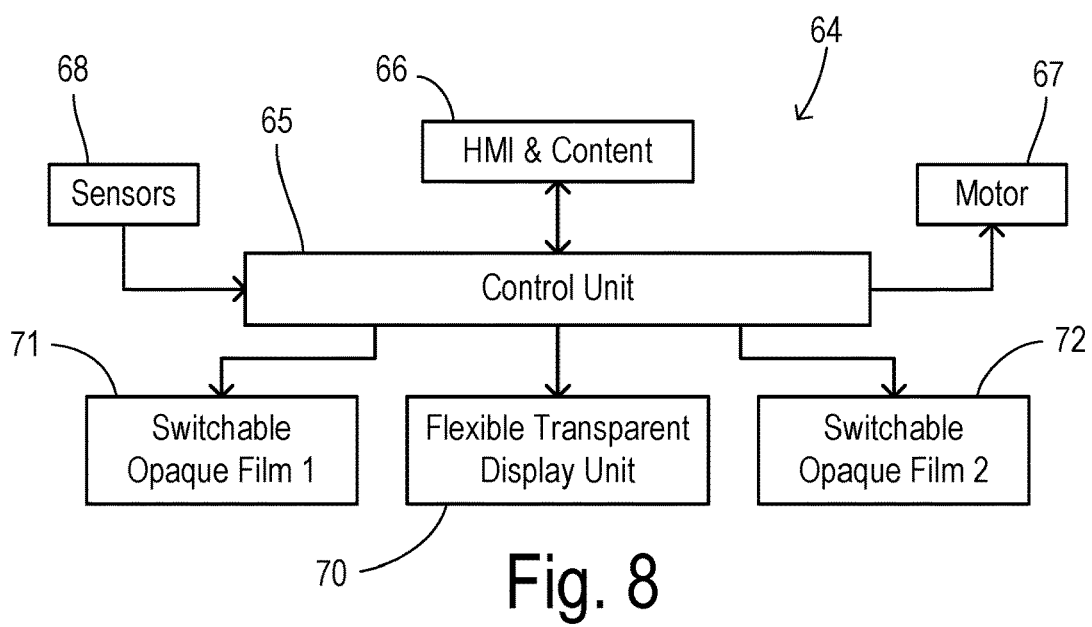
FIG. 8 is a block diagram showing display apparatus of the invention.
Figure 9:
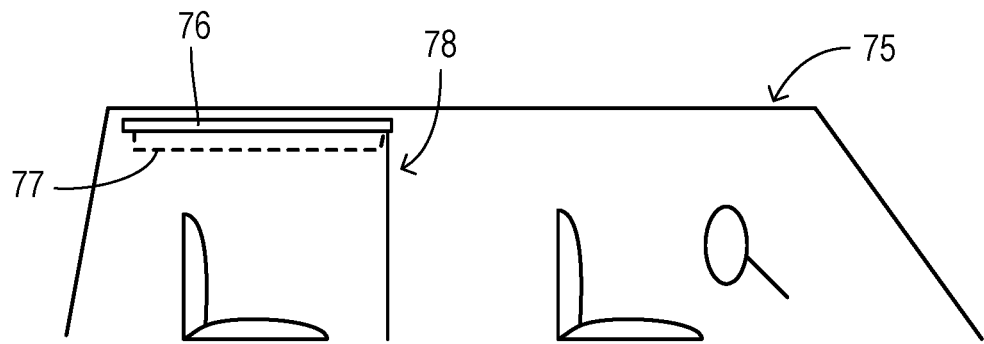
FIG. 9 is a diagram showing a side view of a vehicle passenger cabin with a video screen deployed in a forward position.

FIG. 8 shows a display apparatus 64 having a control unit 65 configured to deploy a display screen according to the modes described herein and to function as a display controller which configures the opaque films and feeds video frame signals to the light-emitting display panel. A network of supporting electronic modules 66 in the vehicle provide a human-machine interface (HMI) for controller 65 and provide a source of video content (e.g., a media reader, a computer, or a streaming video source). Based on command inputs from a user via the HMI (e.g., using either a soft or a hard button of a control menu) and other vehicle status signals (e.g., whether the vehicle is parked and whether a liftgate door is open) controller 65 activates motor 67 to move a display screen between a stowed position and/or a forward deployed position or a rearward deployed position. Motion sensors (e.g., limit sensors) may be coupled to controller 65 in order to monitor movements of the transport unit.

Controller 65 is coupled to switchable opaque films 71 and 72 to apply opaque-film control signals such that one film enters a clear state and the other film enters an opaque state whenever video frame signals are being provided from controller 65 to a flexible transparent display unit 70. By strategically controlling these three elements, the display hardware can display images toward either a front or a rear direction. In addition, one or both of switchable opaque films 71 and 72 could be switched to an opaque state with the video screen deployed but no video images being produced in order to provide a privacy or light blocking shade, if desired.

Figure 10:
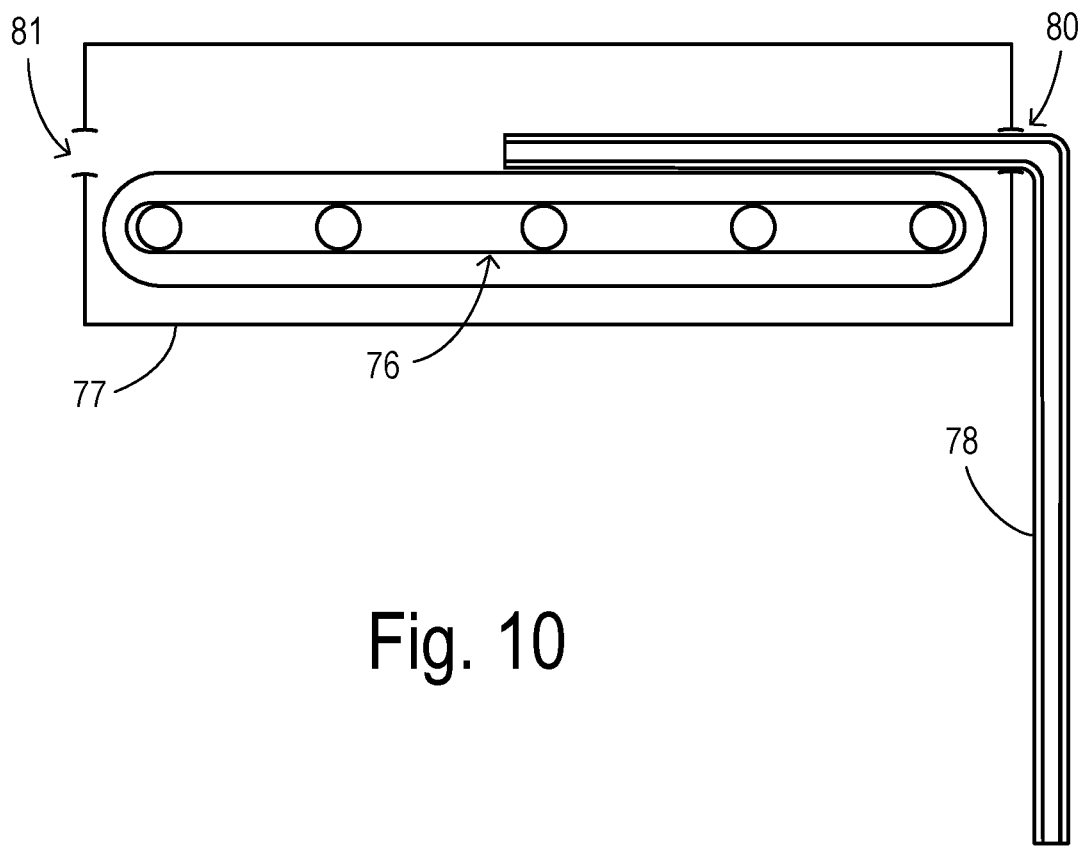
FIG. 10 is a side view of a display apparatus having a housing and a transport unit, and having a video screen in the forward position.

FIGS. 9-12 show an embodiment of the invention wherein a vehicle 75 has a transport unit 76 within a housing 77 which is deployed at a vehicle headliner. By moving a motorized carrier within transport unit 76 in a forward direction, a flexible video screen 78 is pushed forward to a forward position shown in FIG. 9 in which a rear seat passenger can view video images with a switchable opaque film closest to the passenger being in a clear state and the switchable opaque film farthest from the passenger being in an opaque state. As shown in FIG. 10, a slotted opening 80 in housing 77 provides an exit for extending video screen 78. By reversing movement of the motorized carrier in transport unit 76, video screen can be pulled back in and re-stowed within housing 77.

Figure 11:
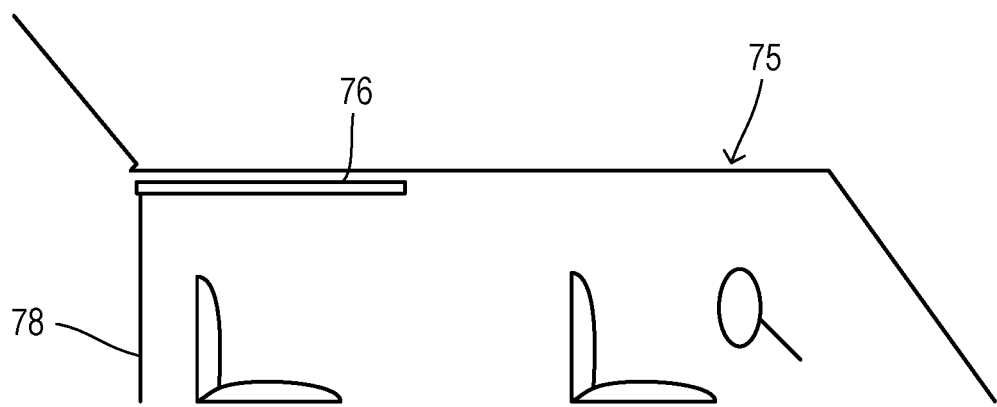
FIG. 11 is a diagram showing a side view of a vehicle passenger cabin with a video screen deployed in a rearward position.
Figure 12:
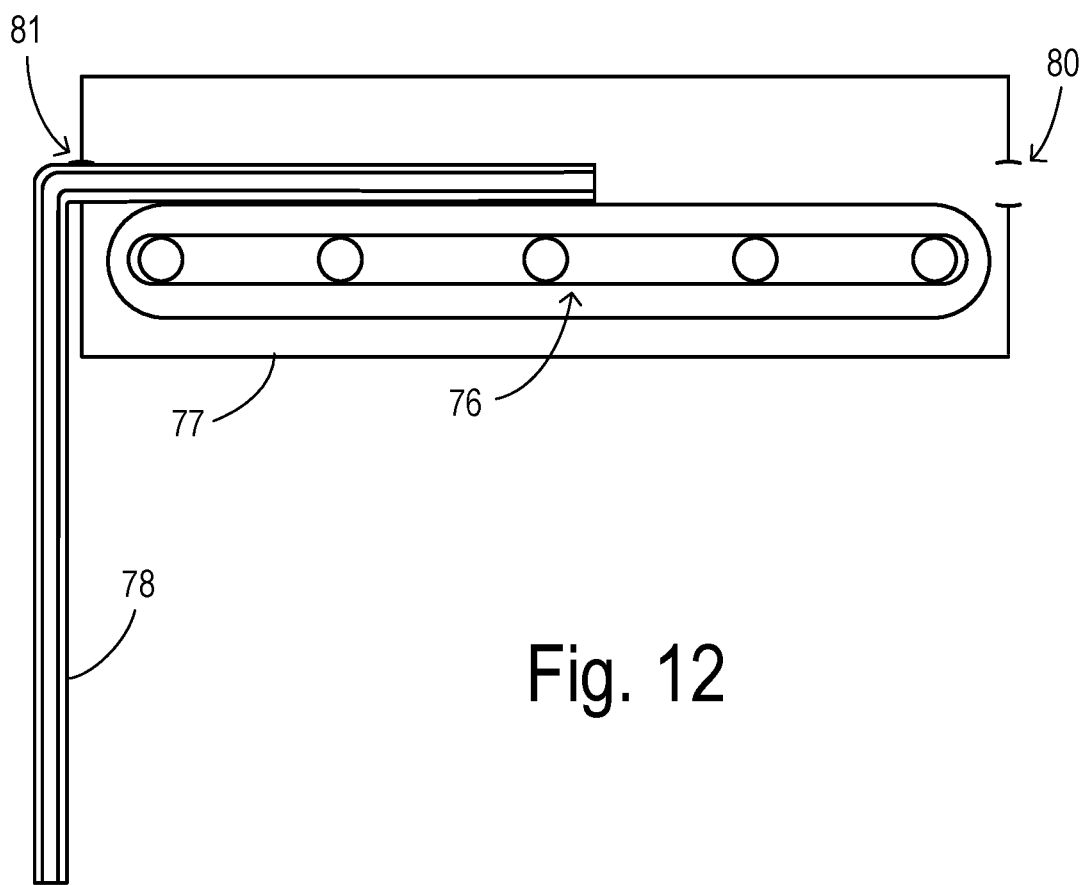
FIG. 12 is a side view of a display apparatus having a housing and a transport unit, and having a video screen in the rearward position.

By moving a motorized carrier within transport unit 76 in a rearward direction, flexible video screen 78 is pushed to a rearward position shown in FIG. 11 in which a person outside the vehicle can view video images with a switchable opaque film closest to the vehicle exterior being in a clear state and the switchable opaque film closest to the vehicle interior being in an opaque state. As shown in FIG. 12, a slotted opening 81 in housing 77 provides an exit for extending video screen 78. By reversing movement of the motorized carrier in transport unit 76, video screen can be re-stowed within housing 77. In another mode of operation, video screen 78 could also be used to provide video images for viewing within the vehicle cabin while in the rearward position in the event that there were rear-facing seating positions in the cabin. In this mode, the clear and opaque states of the opaque films would be swapped.

When the side from which the video screen is changed, the picture orientation of the projected images should also change (e.g., to avoid viewing a mirrored image). Thus, scanning of the video frame signals should begin at a corresponding side of the display panel according to the direction in which the images are projected. More specifically, the display controller will perform a frame scanning to begin at a first edge of the display panel when the first switchable opaque film is switched to an opaque state, and the display controller will perform the frame scanning to begin at a second edge of the display panel when the second switchable opaque film is switched to an opaque state.

In order to maintain a deployed video screen in a desirable flat shape, an array of metal or plastic bars (not shown) can be attach at the fringe strips and/or leading edges of the video screen. The bars can include pivotable linking segments (e.g., similar to garage doors) to provide smooth movement between positions and stabilizing the deployed positions.

What is claimed is:

1. Display apparatus for a passenger cabin of a vehicle having a seating area and a liftgate opening, comprising:
   a flexible video screen comprising first and second switchable opaque films and a transparent, light-emitting display panel, wherein the first and second switchable opaque films are laminated to opposing surfaces of the display panel; and
   a transport unit mounted at a headliner of the cabin over the seating area, wherein the transport unit includes a motorized carrier which is coupled to the video screen, wherein the motorized carrier is configured to move the video screen to a stowed position in which the video screen is retained horizontally in the transport unit, wherein the motorized carrier is configured to move the video screen to a forward position in which the video screen hangs vertically from a forward end of the transport unit, and wherein the motorized carrier is configured to move the video screen to a rearward position in which the video screen hangs vertically from a rearward end of the transport unit;
   wherein the first opaque film is switched to an opaque state and the second opaque film is switched to a clear state when the motorized carrier is in the forward position so that light generated by the display panel is viewable from the seating area.

2. The display apparatus of claim 1 wherein the second opaque film is switched to an opaque state and the first opaque film is switched to a clear state when the motorized carrier is in the rearward position so that light generated by the display panel is viewable from outside the vehicle through the liftgate opening.

3. The display apparatus of claim 1 wherein the first opaque film is switched to an opaque state and the second opaque film is switched to a clear state when the motorized carrier is in the rearward position so that light generated by the display panel is viewable from the seating area.

4. The display apparatus of claim 1 further comprising a display controller providing video frame signals to the display panel, wherein the display controller performs a frame scanning to begin at a first edge of the display panel when the first switchable opaque film is switched to an opaque state, and wherein the display controller performs the frame scanning to begin at a second edge of the display panel when the second switchable opaque film is switched to an opaque state.

5. The display apparatus of claim 1 wherein the switchable opaque films are affixed to opposite faces of the display panel by an optical bonding material.

6. The display apparatus of claim 5 wherein the optical bonding material is comprised of optically clear adhesive or optically clear resin.

7. The display apparatus of claim 1 wherein the flexible video screen further comprises first and second fringe strips along the lateral sides not including the display panel, wherein the motorized carrier captures the fringe strips to transport the video screen, wherein one of the fringe strips includes conductors conveying video frame signals to the display panel, and wherein the apparatus further comprises a flexible cable having a first end attached to the one fringe strip and to the conductors and a second end configured to receive the video frame signals and an opaque film control signal from a display controller.

8. The display apparatus of claim 1 wherein the motorized carrier is comprised of a pair of continuous tracks configured to engage opposite lateral sides of the video screen.

9. A vehicle comprising:
   a body configured to include a passenger cabin having a seating area, a headliner, and a liftgate opening;
   a flexible video screen comprising first and second switchable opaque films and a transparent, light-emitting display panel, wherein the first and second switchable opaque films are laminated to opposing surfaces of the display panel;
   a transport unit mounted at the headliner of the cabin over the seating area, wherein the transport unit includes a motorized carrier which is coupled to the video screen, wherein the motorized carrier is configured to move the video screen to a stowed position in which the video screen is retained horizontally in the transport unit, wherein the motorized carrier is configured to move the video screen to a forward position in which the video screen hangs vertically from a forward end of the transport unit, and wherein the motorized carrier is configured to move the video screen to a rearward position in which the video screen hangs vertically from a rearward end of the transport unit; and a display controller providing video frame signals to illuminate the display panel and shutter signals for controlling the first and second opaque films;

wherein the first opaque film is switched to an opaque state and the second opaque film is switched to a clear state when the motorized carrier is in the forward position so that light generated by the display panel is viewable from the seating area.

10. The vehicle of claim 9 wherein the second opaque film is switched to an opaque state and the first opaque film is switched to a clear state when the motorized carrier is in the rearward position so that light generated by the display panel is viewable from outside the vehicle through the liftgate opening.

11. The vehicle of claim 9 wherein the first opaque film is switched to an opaque state and the second opaque film is switched to a clear state when the motorized carrier is in the rearward position so that light generated by the display panel is viewable from the seating area.

12. The vehicle of claim 9 wherein the display controller performs a frame scanning to begin at a first edge of the display panel when the first switchable opaque film is switched to an opaque state, and wherein the display controller performs the frame scanning to begin at a second edge of the display panel when the second switchable opaque film is switched to an opaque state.

13. The vehicle of claim 9 wherein the switchable opaque films are affixed to opposite faces of the display panel by an optical bonding material.

14. The vehicle of claim 13 wherein the optical bonding material is comprised of optically clear adhesive or optically clear resin.

15. The vehicle of claim 9 wherein the flexible video screen further comprises first and second fringe strips along the lateral sides not including the display panel, wherein the motorized carrier captures the fringe strips to transport the video screen, wherein one of the fringe strips includes conductors conveying the video frame signals to the display panel, and wherein the vehicle further comprises a flexible cable having a first end attached to the one fringe strip and to the conductors and a second end configured to receive the video frame signals and an opaque film control signal from a display controller.

16. The vehicle of claim 9 wherein the motorized carrier is comprised of a pair of continuous tracks configured to engage opposite lateral sides of the video screen.

* * * * *